United States Patent
Pammer et al.

(10) Patent No.: US 6,681,080 B1
(45) Date of Patent: Jan. 20, 2004

(54) WAKE-UP CIRCUIT FOR AN ELECTRONIC APPARATUS

(75) Inventors: Raimund Pammer, Graz (AT); Helmut Rieder, Graz (AT); Wolfgang Boh, Graz (AT)

(73) Assignee: Efkon Entwicklung Forschung & Konstruktion von Sondermaschinen Ges. m..b.H., Graz (AT)

( * ) Notice: Subject to any disclaimer, the term of this patent is extended or adjusted under 35 U.S.C. 154(b) by 0 days.

(21) Appl. No.: 09/462,617

(22) PCT Filed: Jul. 9, 1998

(86) PCT No.: PCT/AT98/00169

§ 371 (c)(1),
(2), (4) Date: Jan. 10, 2000

(87) PCT Pub. No.: WO99/03219

PCT Pub. Date: Jan. 21, 1999

(30) Foreign Application Priority Data

Jul. 10, 1997 (AT) ............................................. 1187/97

(51) Int. Cl.[7] .............................................. H04B 10/00
(52) U.S. Cl. ...................... 398/106; 398/107; 398/202; 398/118
(58) Field of Search ......................... 348/734; 359/142, 359/146, 147, 144, 145, 148, 189; 340/10.33, 825.72, 825.69; 398/151, 120, 106, 107, 108, 109; 257/233, 292

(56) References Cited

U.S. PATENT DOCUMENTS

| 3,657,543 A | * 4/1972 | Rose ........................... 359/162 |
| 4,754,133 A | 6/1988 | Bleich ......................... 250/221 |
| 4,754,175 A | * 6/1988 | Kobayashi et al. ......... 307/117 |
| 4,871,920 A | 10/1989 | Stabile et al. ............... 250/551 |
| 5,115,236 A | 5/1992 | Koehler .................. 340/825.69 |
| 5,355,242 A | 10/1994 | Eastmond et al. .......... 359/189 |

FOREIGN PATENT DOCUMENTS

| EP | 0 046 421 | 2/1982 |
| EP | 0 367 333 | 5/1990 |
| EP | 0 480 410 | 4/1992 |
| FR | 2 715 014 | 7/1995 |
| TW | 353164 | 10/1997 |

* cited by examiner

*Primary Examiner*—Jason Chan
*Assistant Examiner*—Christina Y Leung
(74) *Attorney, Agent, or Firm*—Collard & Roe, P.C.

(57) ABSTRACT

A wake-up circuit for an electronic device comprises an input circuit (1) for receiving infrared signals and an amplifier (2) connected to the input circuit (1), the output of the amplifier being connected to a switching circuit (6) for switching on the device. To improve the signal/noise ratio it is provided that the input circuit (1) includes a parallel arrangement of at least two series arrangements of infrared detectors (7 to 10) as well as a parallel resonant circuit (11), and that the amplifier is a bandpass amplifier (2) the output of which is connected to a signal detector to which the switching circuit (6) is connected.

5 Claims, 2 Drawing Sheets

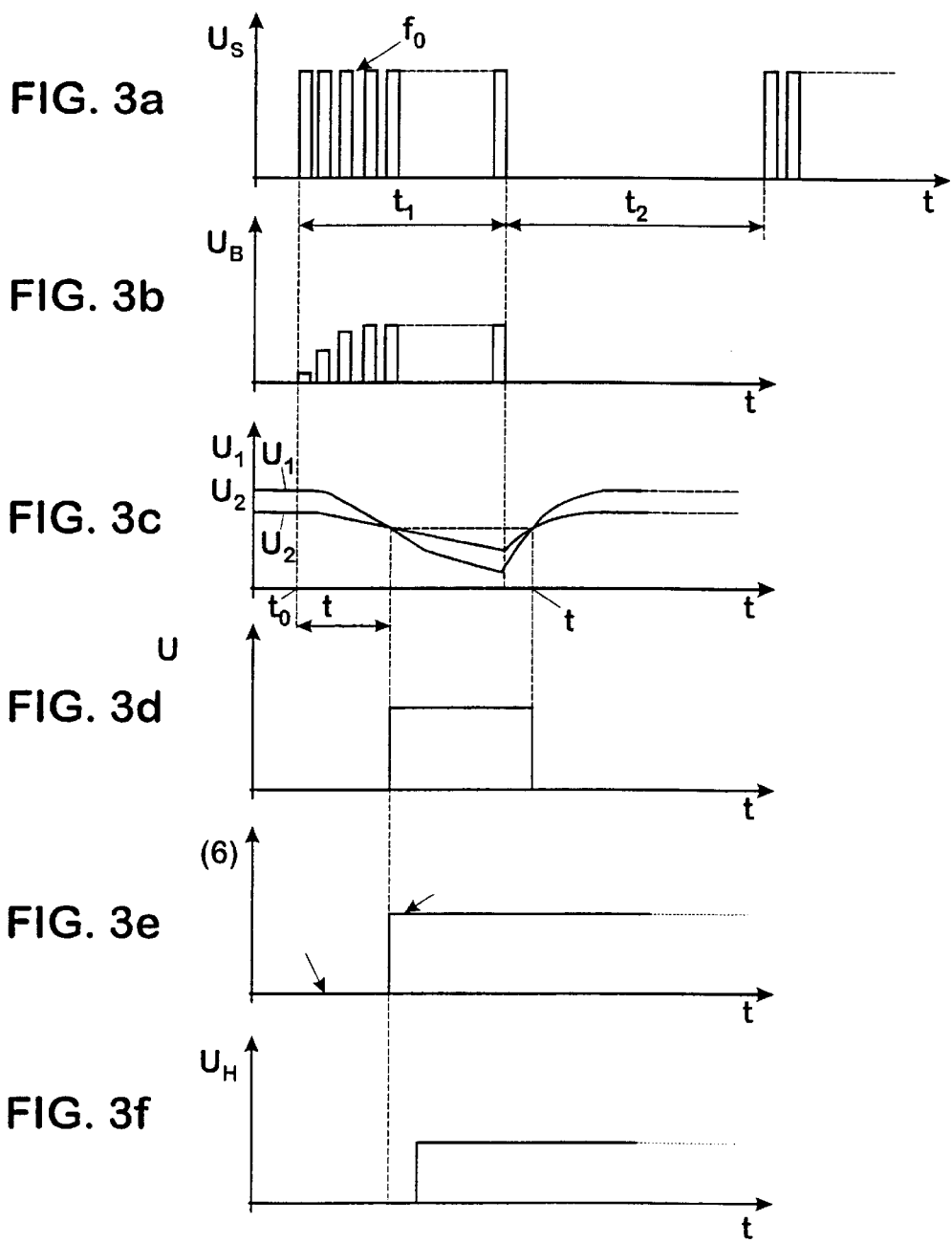

WAKE-UP CIRCUIT FOR AN ELECTRONIC APPARATUS

Applicants claim priority under 35 U.S.C. §119 of Austrian application No. A 1187/97, filed on Jul. 10, 1997. Applicants also claim priority under 35 U.S.C. §365 of PCT/AT98/00169, filed Jul. 9, 1998. The international application under PCT article 21(2) was not published in English.

The invention relates to a wake-up circuit for an electronic device comprising an input circuit for receiving infrared signals and an amplifier connected to the input circuit, the output of the amplifier being connected to a switching circuit for switching on the device.

Such circuits, termed "wake-up" circuits, are utilized e.g. in TV sets or generally in receivers to switch on a device which is in the "stand-by" mode.

Wake-up circuits should consume as little power as possible since they are always connected to a (battery) power supply. At the desired point of time, the wake-up circuit receives an external infrared signal which activates the device or a power consuming appliance, respectively, via the switching circuit. In this connection it must also be taken into consideration that in case of an intensive background light, an increased current noise will occur which will deteriorate the signal/noise ratio.

It is an object of the invention to provide a wake-up circuit of the initally defined kind which enables a selective reception and an amplification of the signals also in case of intensive background light, wherein the circuit configuration nevertheless shall be such that an extremely low power consumption is achieved in the waiting ("sleeping") state of operation.

According to the invention, this object is achieved in that the input circuit includes a parallel arrangement of at least two series arrangements of infrared detectors as well as a parallel resonant circuit, and in that the amplifier is a bandpass amplifier, the output of which being connected to a signal detector to which the switching circuit is connected. By this configuration, the object set out above can well be met. By the parallel connection of branches containing infrared-detectors in series as well as by the filtering effect of the parallel resonant circuit, an increased signal/noise ratio is attained. The wake-up circuit according to the invention thus is particularly suitable for outdoor use, e.g. for switching on infrared transmittors in toll systems on roads.

According to a preferred embodiment of the invention it is provided that the signal detector is formed with two interconnected integrating circuits and a comparator, the one input of the comparator being connected to the output of the one integrating circuit, and the other input being connected to the output of the other integrating circuit. This measure leads to a selective checking of the duration of the signal, i.e. the switching circuit will only be switched on after a pre-determined minimum duration of the signal.

Here, it is also advantageous if the one integrating circuit comprises a capacitor which is connected to a series arrangement of resistors which form a voltage divider, and if the other integrating circuit comprises a resistor connected to the branch-off point of the voltage divider and a capacitor connected to this resistor, the discharge time constant of the one integrating circuit being shorter than the discharge time constant of the other integrating circuit. Despite a low number of electronic elements, in this manner functioning of the signal detector will be very much ensured irrespective of element tolerances and variations of the supply voltage.

An advantageous and simple embodiment of the bandpass amplifier is characterized in that the bandpass amplifier is a multi-stage transistor amplifier with direct current coupling, with the at-rest working currents of the individual transistors each being adjusted to a minimum, whereby a particularly low load on the supply voltage source will be attained.

To still further improve the selectivity of the wake-up circuit with a view to the frequency of the signals, it is provided that the lower cut-off frequency of the bandpass amplifier is adapted to the lower cut-off frequency of the parallel resonant circuit, resulting in an additional improvement of the signal/noise ratio.

The invention will be explained in more detail by way of a preferred exemplary embodiment illustrated in the drawing to which, however, it shall not be restricted.

FIGS. 3a to 3f show time diagrams to explain the function of the wake-up circuit.

Figure 1:
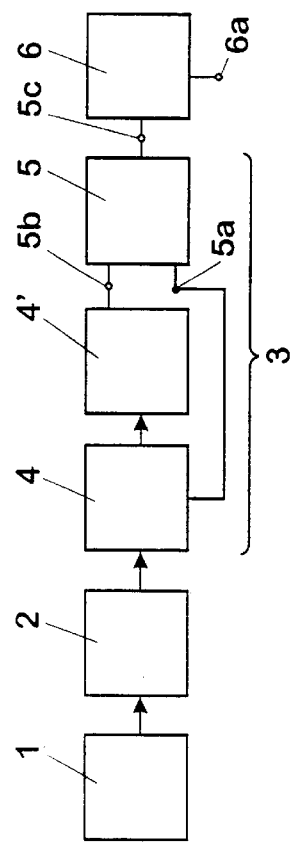
FIG. 1 shows a block diagram of a wake-up circuit.

In FIG. 1, an input ciruit for receiving an infrared signal is denoted by 1, which infrared signal is supplied to an amplifier 2. A signal detector 3 is connected to the amplifier 2, the signal detector comprising a first integrating circuit 4 whose output is led at an input 5a of a comparator 5, whose second input 5b is connected to the output of a second integrating circuit 4' which, in turn, is connected to the first integrating circuit 4. The two integrating circuits 4, 4' and the comparator 5 thus together form the signal detector 3 which is selectively designed for or responds to, respectively, the total duration of a received wake-up signal, as will be explained below in more detail. The comparator 5 may be built of individual electronic elements and configured as an integrated circuit.

The output 5c of the comparator 5 is connected to a switching circuit 6 for switching on and off an electronic device (not illustrated), the switching circuit 6 comprising a hold input 6a the function of which will be explained below.

Figure 2:
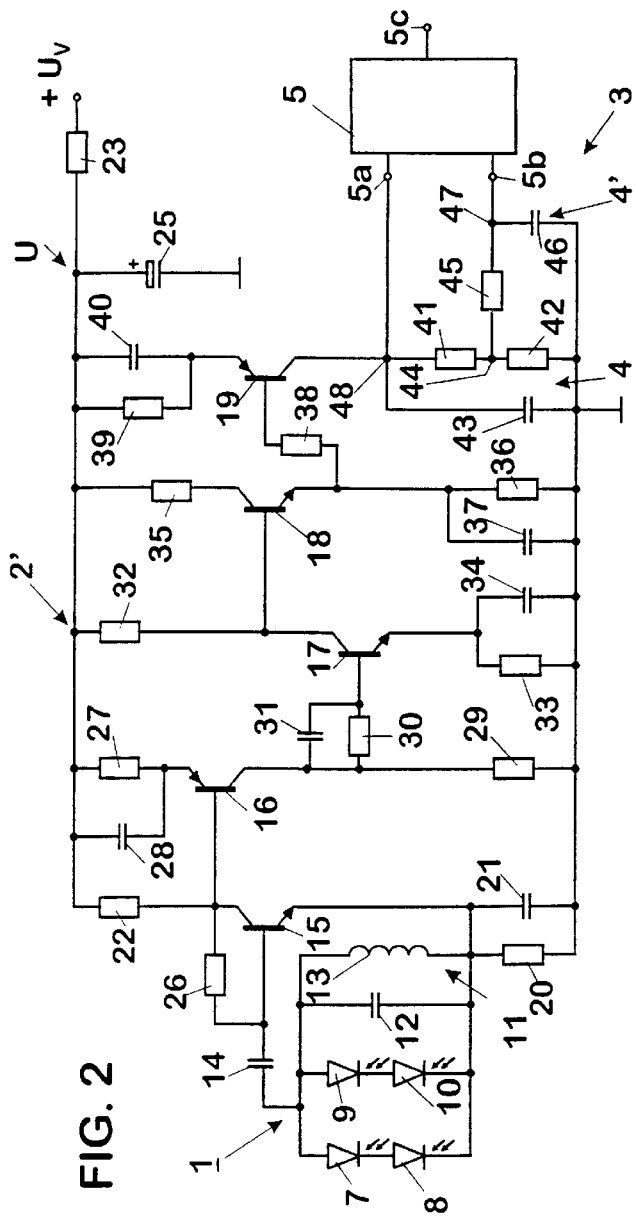
FIG. 2 shows a practical, preferred embodiment of this wake-up circuit.

As can be seen from FIG. 2, the input circuit 1 is comprised of a parallel arrangement of two series arrangements of infrared detectors in the form of infrared photodiodes 7 to 10 as well as of a parallel resonant circuit 11 with a capacitor 12 and an inductor 13. On the one hand, the input circuit 1 is connected to the base of an npn-transistor 12 via a coupling capacitor 14, which npn transistor forms the first stage of the amplifier 2 that is designed as a five-stage bandpass amplifier 2' with DC coupled npn and pnp transistors, respectively, 15 to 19. On the other hand, the input circuit l is connected to the emitter of the transistor 15, the emitter resistor 20 thereof, bridged by a capacitor 21, being connected to ground, and the collector resistor 22 thereof being connected to a positive voltage $U_{sieb}$ which is obtained from a positive supply voltage $U_V$ via a filtering resistor 23; in this case, a filtering capacitor 25 after the filtering resistor 23 is connected to ground. Between the collector and the base of the transistor 15, a bias voltage resistor, or negative feedback resistor 26, respectively, is connected.

The base of the pnp transistor 16 forming the second stage of the bandpass amplifier 2' is directly connected to the collector of the transistor 15 of the first stage. The emitter resistor 27 of the transistor 16 is bridged by a capacitor 28 and connected to the voltage $U_{sieb}$, whereas the collector resistor 29 is connected to ground.

The base of the npn transistor 17 forming the third stage of the bandpass amplifier 2' is connected to the collector of the transistor 16 via a resistor 30 and a coupling capacitor 31 arranged in parallel. The collector resistor 32 of this transistor 17 is connected to the voltage $U_{sieb}$, whereas the emitter resistor 33 is bridged by a capacitor 34 and is connected to ground.

The basis of the npn transistor 18 forming the fourth stage of the bandpass amplifier 2' is directly connected to the collector of the transistor 17. The collector resistor 35 of the transistor 18 is connected to the voltage $U_{sieb}$, whereas the emitter resistor 36 is bridged by a capacitor 37 and is connected to ground.

The basis of the npn transistor 19 forming the fifth stage of the bandpass amplifier 2' is connected to the emitter of the transistor 18 via a resistor 38. The emitter resistor 39 of the transistor 19 is bridged by a capacitor 40 and connected to the voltage $U_{sieb}$.

The collector resistor of the transistor 19 consists of a grounded series arrangement of two resistors 41 and 42 which is bridged by a capacitor 43, the resistors 41, 42 and the capacitor 43 forming the first integrating circuit 4 which has a discharge time constant $\tau_1$ determined by these components 41, 42, 43. From the connection point 44 of the resistors 41, 42, a series circuit of a resistor 45 and a capacitor 46 forming the second integrating circuit 4' leads to ground. The one input 5a of the comparator 5 is connected to the connection point 48 between the collector of transistor 19, the capacitor 43 and the resistor 41, whereas the other input 5b is connected to the connection point 47 between the capacitor 46 and the resistor 45.

In the following, the function of the wake-up circuit according to FIG. 2 will be explained with reference to the time diagrams according to FIGS. 3a to 3f.

As a transmitting modulation type for wake-up circuits, the FSK-OOSK (frequency shift keying-on off shift keying) modulation is suitable, since it is simple and interference-proof, i.e. for a certain time $t_1$, a per se conventional transmitter not further illustrated emits a transmission signal $V_S$ in the form of a pulse package of e.g. 10 pulses with a frequency $f_0$, with a transmission pause time $t_2$ following thereupon (cf. FIG. 3a).

The transmission signal $U_S$ received by the photodiodes 7 to 12 (cf. FIG. 3a) is converted into electrical pulses which temporally build up in the parallel resonant circuit 11 of the input circuit 1 if the parallel resonant circuit 11 is adjusted to frequency $f_0$. In this instance, the quality of the resonant circuit 11 is chosen to be relatively low so as to keep as low as possible the influence of the varying capacity caused by the background light and of the interior resistance of the photodiodes 7 to 10 as well as of the tolerances of the inductivity of the inductor 13 and of the capacity of the capacitor 12 of the parallel resonant circuit 11.

A further selective amplification of the pulses occurs in the bandpass amplifier 2', the lower cut-off frequency being substantially determined by the dimensioning of the RC members 20, 21, 27, 28, 33, 34, 36, 37 and 39, 40 in the emitter circuits of the transistors 15 to 19 as well as of the coupling capacitors 14 and 31 of the transistors 5 and 17, and the upper cut-off frequency being determined by the cut-off frequency of the transistors 15 to 19, the lower cut-off frequency of the bandpass amplifier 2 being adapted to the lower cut-off frequency of the parallel resonant circuit 11.

In this case, the working points of the transistors 15 to 19 are adjusted by the choice of the corresponding resistors in base and collector circuits, respectively, of the transistors such that the at-rest current of each of the five stages of the bandpass amplifier 2' lies in the $\mu A$ range, whereby an extremely low "stand-by power" is taken from the supply voltage $U_V$.

Due to the pulses $U_B$ occurring at the basis of transistor 19 (cf. FIG. 3b), the latter is blocked at each pulse, i.e. the capacitor 43 is discharged via the resistors 41 and 42. Likewise, the capacitor 46 discharges via the resistors 45 and 42, whereby a second discharge time constant $\tau_2$ is defined for this circuit, the discharge time constant $\tau_1$ of the capacitor 43 being chosen to be approximately 1/10 of the discharge time constant $\tau_2$ of the capacitor 46, the capacitor 46 in its charged state being charged to a voltage $U_2$ which is defined by the voltage divider with the resistors 41, 42 at approximately 80% of voltage $U_1$ of the capacitor 43. Consequently, starting from the point of time $t_0$ of the occurrence of pulses, after a time $t_{on}$ defined by the two discharge time constants $\tau_1$ and $\tau_2$, the decreasing voltage $U_1$ at the input 5a will be equal to the decreasing voltage $U_2$ at the input 5b of the comparator 5 (cf. FIG. 3c) so that the voltage $U_{comp}$ (cf. FIG. 3d) at the output 5c of the comparator 5 will rise and, subsequently, the switching circuit 6 will be switched from the operating state "off" to "on" (cf. FIG. 3e). Switching circuit 6 may be designed as a relais or as a power semiconductor element, a driver stage (not illustrated) optionally being provided between the comparator 5 and the switching circuit 6.

As soon as a hold signal $U_H$ (cf. FIG. 3f) has been applied to the hold input 6a of the switching circuit 6 by the device (not illustrated) connected to switching circuit 6 before the time $t_1$ has passed in which, as mentioned above, the pulses are being sent, switching circuit 6 will remain in the operative state "on" for the duration of the hold signal $U_H$.

At the point of time $t_{off}$ (cf. FIG. 3c), the comparator 5 is set back again, if during charging of the capacitors 43 and 46, the increasing voltage $U_1$ of the capacitor 43 again exceeds the voltage $U_2$ at the capacitor 46.

By the above-described course of detection of the signal it is ensured that only pulse packages of a certain frequency and having a certain minimum transmission duration $t_1$ will be received and detected and consequently will lead to the switching on of switching circuit 6.

What is claimed is:

1. A wake-up circuit for an electronic device comprising an input circuit for receiving infrared signals and an amplifier connected to the input circuit, the output of the amplifier being connected to a switching circuit for switching on the device, characterized in that the input circuit includes a parallel arrangement of at least two series arrangements of infrared detectors as well as a parallel resonant circuit, and that the amplifier is a bandpass amplifier the output of which is connected to a signal detector to which the switching circuit is connected.

2. A wake-up circuit according to claim 1, characterized in that the signal detector comprises two interconnected integrating circuits and a comparator, one input of the comparator being connected to the output of the one integrating circuit, and another input being connected to the output of the other integrating circuit.

3. A wake-up circuit according to claim 2, characterized in that one of the integrating circuits comprises a resistor connected to a branch-off point of the voltage divider and a capacitor connected to this resistor, the discharge time constant of the one integrating circuit being shorter than the discharge time constant of the other integrating circuit.

4. A wake-up circuit according to claim 1, characterized in that the bandpass amplifier is a multistage transistor amplifier with direct current coupling, with the at-rest working currents of the individual transistors each being adjusted to a minimum.

5. A wake-up circuit according to claim 1, characterized in that the lower cut-off frequency of the bandpass amplifier is adapted to the lower cut-off frequency of the parallel resonant circuit.

* * * * *